Sept. 7, 1965        H. GOLDEN        3,204,481
HANDLE BAR JOINT CASING
Filed Aug. 5, 1963
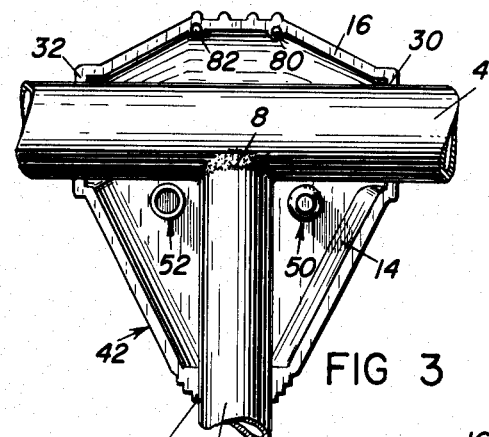
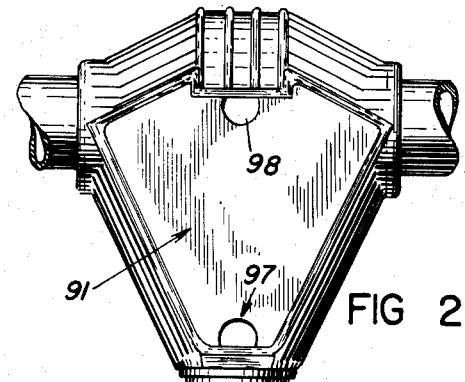
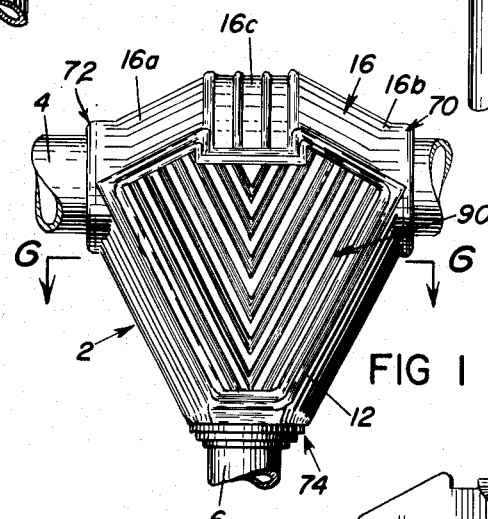
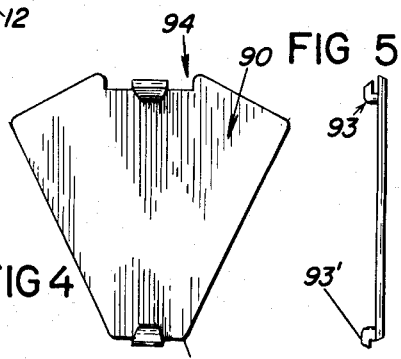
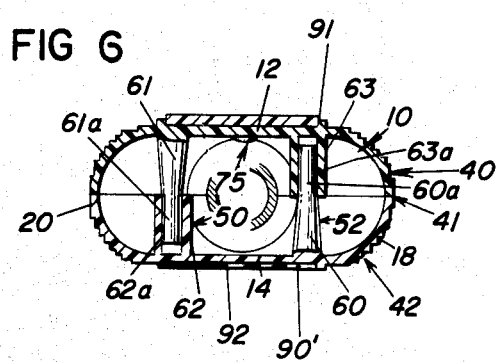
*Harry Golden*
INVENTOR
BY Jacobi & Davidson
ATTORNEYS United States Patent Office 3,204,481
Patented Sept. 7, 1965

3,204,481
HANDLE BAR JOINT CASING
Harry Golden, New York, N.Y., assignor to Ideas for Auto & Bike Specialties, Inc., New York, N.Y., a corporation of New York
Filed Aug. 5, 1963, Ser. No. 299,846
6 Claims. (Cl. 74—551.1)

This invention relates to decorative casings, and is particularly concerned with the provision of a decorative casing which is adapted to enclose the joint between a conventional handle bar, and the supporting shaft projecting therefrom.

The normal handle bar steering unit used with vehicles, such as, for example, a bicycle, usually includes a handle bar which is substantially horizontally disposed, and a supporting shaft projecting laterally and downwardly from the handle bar to couple the same with other components of the steering assembly. The joint between the handle bar and the supporting shaft extending therefrom conventionally is made by welding the supporting shaft to the handle bar. Of course, other means of fixing the supporting shaft to the handle bar can be used, but regardless of the means used, the joint between the supporting shaft and the handle bar is commonly unattractive.

Bearing the above in mind, the present invention has as one of its primary objects the provision of a decorative casing which can be easily fastened about the handle bar and supporting shaft at the joint therebetween to enclose such joint. Another primary object of the present invention in this regard is the provision of such a casing which can be easily fixed in desired ultimate position without requiring any tools, or any special dexterity or manipulating ability.

Aside from the above basic objects of the invention, there are certain equally important, but somewhat more specific objects, including: (a) the provision of a decorative casing as prescribed above which not only covers the handle bar joint, but in addition renders the general handle bar unit more attractive in appearance; (b) the provision of such a casing which can be manufactured inexpensively so as to be available for widespread use; (c) the provision of such a casing which is so constructed that it includes a pair of identical and releasably engageable shell parts, thus eliminating the normal manufacturing and packaging problems incident to the use of different but engageable assembly parts; (d) the provision of such a casing which incorporates a basic body portion and separable face plates which can easily be attached thereto whereby the trademarks of different manufacturers, or different designs can be used with the same basic body portion merely by varying the external surface of a face plate; and (e) the provision of such a casing which incorporates post and socket cooperating fastening means and snap flange means to secure the various parts of the casing in desired engagement with one another.

In addition to the foregoing objects which are directed to the structural and functional aspects of the invention, it should be noted that an important but auxiliary object of the instant invention is to provide a decorative casing conforming with the preceding objects, and which includes component parts that can be easily manufactured from plastic materials and through high-speed injection molding techniques so as to minimize the manufacturing costs.

The invention will be better understood, and objects other than those specifically set forth above will become apparent, when consideration is given to the following detailed description. Such description refers to the annexed drawing presenting a preferred and illustrative embodiment thereof.

In the drawings:

FIGURE 1 is a plan view of a complete decorative casing constructed in accordance herewith, and this figure schematically illustrates the manner in which such casing cooperates with a handle bar unit;

FIGURE 2 is a plan view of the unit shown in FIGURE 1, but without at least the upper face plate being applied thereto;

FIGURE 3 is a plan view similar to FIGURES 1 and 2, but showing the casing hereof with the upper shell part removed;

FIGURE 4 is a bottom plan view of a face plate constructed in accordance herewith and adapted to be associated with the casing hereof;

FIGURE 5 is a side view of the face plate shown in FIGURE 4; and

FIGURE 6 is a transverse sectional view taken on the line 6—6 of FIGURE 1, and showing the interior cooperating components providing a fastening means for securing the shell parts of the casing hereof in engagement with one another.

If reference is first made to FIGURE 1, it will be noted that the casing shown therein is generally designated by the numeral 2. Such casing cooperates with a handle bar, partially shown and generally designated by the numeral 4, and a supporting shaft, also partially shown, and generally designated by the numeral 6. As shown in FIGURE 3, the supporting shaft 6 extends laterally from the handle bar 4, but is joined thereto as by welding, at the joint 8. It will be appreciated that the showing of the handle bar, of the supporting shaft, and of the joint therebetween is illustrative. The particular construction of the handle bar, of the supporting shaft, and of the joint therebetween is not of importance with respect to the invention. The important point to understand is that the casing provided by the invention is adapted to cover such a joint, whether it be specifically of the type illustrated in the drawing, or of some other type.

If reference is now made cumulatively to FIGURES 1 and 6, it will be noted that the casing 2 comprises a hollow body 10 having a pair of opposed spaced apart generally triangular top and bottom walls 12 and 14. A front wall 16 extends between aligned front edges of the top and bottom walls 12 and 14. The front wall 16, as shown, preferably has a pair of outwardly converging end sections 16a and 16b joined together by a forward central section 16c.

A pair of side walls 18 and 20 extend respectively between aligned opposite side edges of the top and bottom walls 12 and 14. As shown in FIGURE 6, the side walls 18 and 20 converge toward one another inwardly from the front wall 16 to the rear of the hollow body 10. Preferably, as shown in FIGURE 6, the side walls 18 and 20 are arcuately contoured, and similarly, the front wall 16 has a correspondingly arcuate contour.

As indicated by FIGURE 1, but possibly as best shown in FIGURE 3, the hollow body 10 has a pair of axially aligned bar receiving openings 30 and 32. Such openings are disposed respectively at opposite ends of the front wall 16 and face to the sides of the hollow body 10. In addition to the bar receiving openings 30 and 32, the body has a shaft receiving opening 34 disposed at the rear of the body and facing rearwardly therefrom.

By again referring to FIGURE 6, it will be noted that the hollow body 10 itself comprises a pair of cooperating shell parts generally designated by the numerals 40 and 42. These shell parts mate with one another along the front and side walls of the body, as explained more fully below. The shell parts 40 and 42 carry cooperating fastening means 50 and 52 which secure the shell parts 40 and 42 to one another to thereby form the hollow body 10. As shown in FIGURE 3, the fastening means 50 and 52 are disposed within the hollow body 10, but outside of a first path extending directly between the pair of bar receiving openings 30 and 32 and outside of a second path extending directly from the shaft receiving opening 34 into the first path. The first and second paths, consistent with this terminology, are filled in FIGURE 3 respectively by the handle bar 4 and the supporting shaft 6. In other words, the fastening means 50 and 52 are disposed within the hollow body 10, but in non-interfering relation to the space which is occupied by the handle bar 4 and the joined supporting shaft 6.

The cooperating fastening means 50 and 52 comprise respectively cooperating post and socket members. As shown in FIGURE 6, a first post member 60 projects upwardly from the bottom wall 14, and a first socket member 62 similarly projects upwardly from such wall. A second post member 61 projects downwardly from the top wall 12, and a second socket member 63 also projects downwardly from the top wall 12. The first post member 60 is shaped and disposed to be frictionally received in the second socket member 63, whereas the second post member 61 is shaped and disposed to be frictionally received in the first socket member 62. Each of the socket members, as shown, has a cylindrical recess or bore, 62a and 63a respectively, which tightly frictionally receives the cylindrical free end portion 60a and 61a respectively of the associated post member.

It will be noted from FIGURE 3 that the socket member and post member carried on the bottom wall 14 are aligned with one another along an axis extending parallel to the common axis of the bar receiving openings 30 and 32—an axis parallel to the mean longitudinal axis of the front wall 16.

While only the shell part 42 has been shown in FIGURE 3, the other shell part 40 is identical with the shell part 42. By virtue of such construction, one need not be concerned with keeping basic parts of the assembly in separate groups or different bins. Instead, so long as two shell parts constructed in accordance herewith are available, a casing conforming with the invention can easily be made. In this regard, it is again significant to note that one post member and one socket member are carried within each of the shell parts to cooperate with corresponding post and socket members in an identical shell part. As best shown in FIGURES 3 and 6, the shell parts each comprise one-half of the hollow body 10 essentially as upper and lower pieces. Specifically, the shell parts 40 and 42 mate with one another along abutting free edge portions disposed in a plane parallel to and extending centrally between the top and bottom walls. Such edge portions are shown in engagement as at 41 in FIGURE 6.

The openings 30, 32 and 34 referred to above can take various forms depending on the contour of the handle bar unit with which the casing is to be associated. However, in the normal instance, the handle bar and supporting shaft therefor are circular in cross section. Accordingly, the preferred embodiment hereof provides for making the openings 30, 32 and 34 circular in contour. Furthermore, preferably each of the openings is in a reinforced portion of the hollow body 10. Specifically, it will be noted from FIGURES 1 and 3 that the opening 30 is disposed at the extremity of an outwardly facing generally cylindrical body section 70. Similarly, the bar receiving opening 32 is disposed in an outwardly facing generally cylindrical body section 72, and the shaft receiving opening 34 is disposed in a rearwardly facing generally cylindrical body section 74. These body sections 70, 72 and 74 are located respectively at the junctions between the front wall 16 and the side wall 18, the front wall 16 and the side wall 20, and the side wall 18 and 20—i.e., at the corners of the triangular hollow body 10. To form such sections on the hollow body 10 merely requires proper shaping of the mold, and with the formation of such sections, as shown, there is essentially a rim flange or edge portion peripherally defining each opening.

To facilitate an alignment between the respective shell parts 40 and 42, and further to insure positive engagement of the parts along the front wall of the casing 2, each of the parts 40 and 42 is provided with an aligning ball and an aligning socket. By referring to FIGURE 3, it will be noted that the aligning ball 80 projects upwardly from the top edge of the front wall of shell part 42 and that an aligning recessed socket 82 is disposed in spaced relation to the aligning ball 80 but along the same front wall. Preferably, these aligning ball and socket features incorporated in each shell part are disposed at the junction between the end sections of the front wall and the central section thereof. The reason for this disposition is that it insures proper alignment of the front walls of respective shell parts at the corners or joints in such walls.

Aside from the basic body portion discussed in detail above, a casing constructed in accordance with the present invention additionally includes a pair of face plates. One such face plate is shown in FIGURE 1 and generally designated by the numeral 90. This face plate, as shown in FIGURE 4, has a generally triangular contour. The top wall 12 of the hollow body 10, as shown in FIGURES 2 and 6, is recessed as at 91 so as to have thereon a recessed area for receiving a face plate 90. The bottom wall 14, as also shown in FIGURE 6, is similarly recessed as at 92. The face plate 90 can fit either within the recessed area of the top wall or the recessed area of the bottom wall, and thus only one face plate has been shown in FIGURES 4 and 5. Still, it will be understood that the face plate 90' shown as attached to the bottom wall 14 in FIGURE 6 corresponds identically with the face plate 90.

The face plate 90 has a pair of L-shaped couplings 93 and 93' as shown in FIGURE 5, projecting from the underside thereof. These couplings are preferably centrally disposed along the top and bottom edges 94 and 95 of the face plate 90. Such couplings are adapted to fit through openings provided in the recessed areas on the top and bottom wall and extending therethrough. Specifically, these latter-mentioned openings are shown in FIGURE 2 and desigated by the numerals 97 and 98. The spacing between the openings 97 and 98, or more particularly, the outwardly facing edges thereof, is such that when the face plate 90 is placed in the recessed area 91, the L-shaped couplings 93 and 93' project respectively through the openings 97 and 98 with the base portion of each coupling engaging the underside of the top wall 12. This engagement is shown at 75 in FIGURE 6. As noted, the face plate which is associated with the bottom wall is similarly secured in position, and accordingly, duplication of description with respect to the bottom face plate appears unnecessary.

The important point to understand with regard to the face plate is that couplings thereon and the face plate itself are sufficiently flexible to permit the snap fit thereof in position with the couplings passing through the associated openings to engage the underside of the associated wall. Alternatively, both the face plate and the hollow body portion may be sufficiently flexible to permit this procedure, or only the hollow body portion itself may be so flexible. Regardless of the particular component or components which are made flexible for this purpose, the snap fit permits changing the appearance of the casing merely with a change in face plates, and without changing the basic hollow body forming shell parts. Thus, if a particular manufacturer desires his trademark to be shown on the casing hereof, it is merely necessary to modify the outer face of one of the face plates. The remaining components can remain the same as with a construction wherein a different trademark is shown, or wherein merely some design is used on the face plates.

Although not specifically mentioned above, it will be appreciated that various artistic configuration can be incorporated on the exterior surface of the casing hereof to give the same desirable aesthetic properties. Line designs are shown as extending over the exterior surface of the casing, and such designs serve to exemplify the manner in which an attractive appearance can be created with the invention.

Having now described a preferred embodiment hereof in considerable detail, it will be appreciated that the objects set forth at the outset of the present specification have been successfully achieved.

What is claimed is:

1. A decorative casing for enclosing the joint between a handle bar and a supporting shaft extending laterally therefrom, said casing comprising:
   (a) a hollow body having a pair of opposed spaced apart generally triangular top and bottom walls; a front wall extending between aligned front edges of said top and bottom walls and a pair of side walls extending respectively between aligned opposite side edges of said top and bottom walls whereby said side walls converge inwardly toward one another from said front wall to the rear of said body;
   (b) said body having a pair of axially aligned bar receiving openings therein disposed respectively at opposite ends of said front wall and facing to the sides of said body;
   (c) said body having a shaft receiving opening disposed at the rear of said body and facing rearwardly thereof;
   (d) said body comprising a pair of cooperating shell parts mating with one another along said front and side walls;
   (e) said shell parts carrying cooperating fastening means for securing said parts to one another, said fastening means being disposed within said body outside of a first path extending directly between said pair of bar receiving openings and outside of a second path extending directly from said rear opening to said first path,
   whereby said casing is adapted to receive a handle bar through said pair of bar openings and a supporting shaft therefor through said shaft opening to enclose the joint between the handle bar and the supporting shaft therefor.

2. A decorative casing as defined in claim 1, wherein said cooperating fastening means comprise a first post member and a first socket member projecting upwardly within said body from said bottom wall, and a second post member and a second socket member projecting downwardly within said body from said top wall, said first post member being shaped and disposed to be frictionally received in said second socket member and said second post member being shaped and disposed to be frictionally received in said first socket member.

3. A decorative casing as defined in claim 2, wherein said first and second socket members have cylindrical recesses therein and wherein said first and second post members have cylindrical free end portions.

4. A decorative casing as defined in claim 2, wherein said cooperating shell parts each comprise one-half of said hollow body, and wherein said shell parts mate with one another along abutting edge portions disposed in a plane parallel to and extending centrally between said top and bottom walls.

5. A decorative casing as defined in claim 4, wherein the exterior faces of said top and bottom walls have recessed areas thereon, wherein openings through said top and bottom walls respectively are disposed in spaced apart locations in said recessed areas, and wherein said casing further includes a pair of decorative face plates received in said recessed areas, each of said plates carrying projecting L-shaped couplings, each of said couplings extending through one of the last-mentioned openings and abutting the underside of the adjacent wall to secure said face plates to said respective top and bottom walls.

6. A decorative casing for enclosing the joint between a handle bar and a supporting shaft extending laterally therefrom, said casing comprising:
   (a) a hollow body having a pair of opposed spaced apart generally triangular top and bottom walls; a front wall extending between aligned front edges of said top and bottom walls, and a pair of side walls extending respectively between aligned opposite side edges of said top and bottom walls;
   (b) said body having a pair of axially aligned bar receiving openings therein disposed respectively at opposite ends of said front wall and facing to the sides of said body;
   (c) said body having a further bar receiving opening disposed at the rear of said body and facing rearwardly thereof;
   (d) said body comprising a pair of cooperating shell parts mating with one another along said front and side walls;
   (e) said shell parts carrying cooperating fastening means for securing said parts to one another, said fastening means being disposed within said body outside of a first path extending directly between said pair of bar receiving openings and outside of a second path extending directly from said rear opening to said first path, said fastening means comprising a first post member and a first socket member projecting upwardly within said body from said bottom wall, and a second post member and a second socket member projecting downwardly within said body from said top wall, said first post member being shaped and disposed to be frictionally received in said second socket member and said second post member being shaped and disposed to be frictionally received in said first socket member;
   (f) said shell parts each comprising one-half of said hollow body, said shell parts mating with one another along abutting edge portions disposed in a plane parallel to and extending centrally between said top and bottom walls.

References Cited by the Examiner

UNITED STATES PATENTS

| D. 199,171 | 9/64 | Golden | D. 90—11 |
|---|---|---|---|
| 556,165 | 3/96 | Root | 74—543 |
| 1,253,494 | 1/18 | James | 287—54 |
| 1,406,247 | 2/22 | Tubbs | 287—52.09 X |
| 1,703,857 | 2/29 | Hamilton | 40—143 |
| 2,180,617 | 11/39 | Snell | 74—551.1 |
| 2,253,857 | 8/41 | Hedstrom | 287—54 |
| 2,398,436 | 4/46 | Mason. | |
| 2,441,616 | 5/48 | Burke | 74—553 X |
| 3,067,536 | 12/62 | Brittsan | 40—143 X |

FOREIGN PATENTS

| 16,981 | 12/62 | France. |
|---|---|---|
| | | (2nd add. to No. 438,848) |
| 441,673 | 11/48 | Italy. |

BROUGHTON G. DURHAM, *Primary Examiner.*